United States Patent
Le Berre et al.

(10) Patent No.: US 10,677,622 B2
(45) Date of Patent: Jun. 9, 2020

(54) SYSTEM FOR MEASURING FLOW OF A LIQUID IN A MICROFLUIDIC CIRCUIT BY DETERMINING GAS AND LIQUID PRESSURES

(71) Applicant: ELVESYS, Paris (FR)

(72) Inventors: Maël Le Berre, Paris (FR); Mathieu Velve Casquillas, Paris (FR)

(73) Assignee: ELVESYS, Paris (FR)

( * ) Notice: Subject to any disclaimer, the term of this patent is extended or adjusted under 35 U.S.C. 154(b) by 45 days.

(21) Appl. No.: 16/072,117

(22) PCT Filed: Jan. 19, 2017

(86) PCT No.: PCT/EP2017/051092
§ 371 (c)(1),
(2) Date: Jul. 23, 2018

(87) PCT Pub. No.: WO2017/125499
PCT Pub. Date: Jul. 27, 2017

(65) Prior Publication Data
US 2019/0025100 A1   Jan. 24, 2019

(30) Foreign Application Priority Data
Jan. 22, 2016 (FR) ...................... 16 00108

(51) Int. Cl.
*G01F 1/48* (2006.01)
(52) U.S. Cl.
CPC ...................... *G01F 1/48* (2013.01)
(58) Field of Classification Search
None
See application file for complete search history.

(56) References Cited

U.S. PATENT DOCUMENTS 3,882,723 A * 5/1975 Wickham ................ B60T 13/26
                                                              73/199
5,515,735 A   5/1996 Sarihan
6,203,759 B1 * 3/2001 Pelc ...................... B01L 3/0265
                                                              222/333
(Continued)

FOREIGN PATENT DOCUMENTS

CA    2 843 815 A1   3/2013
EP    0 810 438 A2  12/1997
WO    97/40350 A1   10/1997

OTHER PUBLICATIONS

Richter et al., "Microchannels for applications in liquid dosing and flow-rate measurement," Sensors and Actuators A: Physical, Jul. 1997, pp. 480-483, vol. 62, No. 1-3, Elsevier.
(Continued)

*Primary Examiner* — Harshad R Patel
(74) *Attorney, Agent, or Firm* — Im IP Law; Chai Im; C. Andrew Im

(57) ABSTRACT

A system to measure the flow rate of a liquid in a microfluidic circuit. The system includes a vessel that is partially filled with the liquid, a gaseous ceiling above the vessel and a pressure regulator to maintain the pressure of the gas in the gaseous ceiling at a predetermined value P1. A capillary pipe to extract the liquid from the vessel and to output the liquid at a pressure P2 lower than P1. A first inlet of the pressure sensor is connected to the gaseous ceiling, a second inlet of the pressure sensor is connected to the capillary pipe, and the outlet of the pressure sensor outputs a signal as a function of the pressure difference (P1-P2), which is a measurement representing the flow rate of pressurized P2 liquid supplied to the microfluidic circuit.

17 Claims, 9 Drawing Sheets

(56) References Cited

U.S. PATENT DOCUMENTS

| | | | | |
|---|---|---|---|---|
| 6,521,187 | B1* | 2/2003 | Papen | B01L 3/0268 222/263 |
| 6,537,817 | B1* | 3/2003 | Papen | B01L 3/0268 134/22.11 |
| 6,592,825 | B2* | 7/2003 | Pelc | B01L 3/0265 222/333 |
| 7,470,547 | B2* | 12/2008 | Tisone | B01D 19/0047 436/180 |
| 7,637,152 | B2* | 12/2009 | Ushigusa | G01F 1/42 137/458 |
| 7,765,872 | B2* | 8/2010 | Morales | G01F 1/363 73/706 |
| 8,403,908 | B2 | 3/2013 | Jacobson et al. | |
| 9,739,653 | B2* | 8/2017 | Berger | G01F 1/42 |
| 2006/0144151 | A1 | 7/2006 | Krause et al. | |
| 2009/0078038 | A1* | 3/2009 | Ushigusa | G01F 1/42 73/195 |
| 2012/0318383 | A1 | 12/2012 | Yasuda et al. | |

OTHER PUBLICATIONS

Boillat et al., A differential pressure liquid flow sensor for flow regulation and dosing systems, Proc. IEEE Micro Electro Mechanical Systems, Jan. 29, 1995, pp. 350-352, vol. workshop 8, IEEE, New York, US.

Oosterbroek et al., "A micromachined pressure/flow-sensor," Sensors and Actuators, Nov. 2, 1999, pp. 167-177, vol. 77, No. 3, Elsevier.

Westin et al., "A novel system for measuring liquid flow rates with nanoliter per minute resolution," Experiments in Fluids, Apr. 12, 2003, pp. 635-642, vol. 34, No. 5.

N. T. Nguyen, "Micromachined flow sensors—a review," Flow Measurement and Instrumentation, Mar. 1997, pp. 7-16, vol. 8, No. 1, Elsevier.

Liu et al., "Design and Fabrication of a MEMS Flow Sensor and Its Application in Precise Liquid Dispensing," Sensors, Jun. 2, 2009, pp. 4138-4150, vol. 9, No. 6.

* cited by examiner

SYSTEM FOR MEASURING FLOW OF A LIQUID IN A MICROFLUIDIC CIRCUIT BY DETERMINING GAS AND LIQUID PRESSURES

RELATED APPLICATIONS

This application is a § 371 application from PCT/EP2017/051092 filed Jan. 19, 2017, which claims priority from French Patent Application No. 16 00108 filed Jan. 22, 2016, each of which is incorporated herein by reference in its entirety.

Field of the Invention

The present invention relates to a system for measuring the micro-fluidic flow of a liquid by using a pressure measurement of a gas on the one hand and a pressure measurement of the liquid on the other hand. It relates more particularly to a system for measuring the flow of a liquid in a micro-fluidic circuit, the flow measurement according to the invention being fast, precise, and much simpler to implement than the known flow measurement methods adapted to micro-fluidic flows. Moreover, this flow measurement method allows a fast-automatic control of the measured flow, i.e. a flow control for the liquid.

The invention also relates to a pressure sensor for a fluid, preferably a liquid, as well as a differential pressure sensor for two fluids, in particular a gas and a liquid when implemented in the flow measurement system according to the invention.

The invention also relates to a reservoir assembly and pressure sensor built into the reservoir cap, a capillary-type pipe acting as a hydraulic resistance connecting at least partially the liquid in the reservoir to a sensor input.

Other aspects of the invention relate to the use of the measuring system and/or flow control as well as the use of the pressure sensor, in simple or differential form, in applications such as perfusion of a cell culture medium, reagents in a chemical reactor, control of the clogging of micro-fluidic pipes, or the fabrication of a high-rate drop generator.

Background of the Invention

From the article entitled "micromachined flow sensors—a review" by N. T. Nguyen published in the journal FLOW MEASUREMENT AND INSTRUMENTATION, March 1997, many methods are known for measuring the flow of a liquid in the range of micro-fluidic flows, i.e. lower liquid flows at 100 mL/min, and typically between 1 μL/min and 1 mL/mm for most applications. The most common methods are based on the use of thermal sensors using the measurement of the displacement of a thermal flux transported by the movement of the liquid (see for example the sensor in the LG16 range marketed by the company Sensirion AG.).

It is also known to use vibrating sensors based on the Coriolis force to perform fluid flow measurements such as those sold under the name Cori-FLOW by the company Bronkhorst.

It is also known to use the measurement of a difference in pressures to measure gas flows (see, for example, the differential pressure sensors marketed by the company First Sensor).

Pressure sensors are described for example in U.S. Pat. Nos. 5,515,735, 8,403,908, or WO9740350 and are can be used for measuring the flow of liquids by using two liquid pressure sensors measuring the pressure drop of the liquid in a pipe or through restrictions of various shapes.

In the article entitled "Design and Fabrication of a MEMS Flow Sensor and Its Application in Accurate Liquid Dispensing" by Yaxin Liu et al., State Key Laboratory of Robotics and System, Harbin Institute of Technology, Harbin, China, the authors measure this pressure difference downstream of a liquid reservoir whose pressure is controlled by means of two liquid pressure sensors.

A liquid pressure sensor is also known from US 2006/144151, in which sealing is performed by means of two diaphragms 22 and 24, glued with a layer of glue 23, which is complicated to achieve and unreliable: a simpler and more reliable solution is needed when using two different fluids at pressures that can be variable.

All micro-fluidic flow sensors known to date and described above used for controlling a micro-fluidic flow have a number of disadvantages:

Sensors based on thermal measurement are generally inaccurate and sensitive to the environment and the nature of the liquid.

Differential pressure sensors, for example using two pressure sensors separated by a restriction, can have very low response times (<10 ms) and can be accurate (<5% FS) but these sensors are complex to achieve in a single sensitive element in a micro-fluidic application because it is necessary to integrate in this single element two pressure-sensitive elements and a restriction on the same micro-fluidic chip. In addition, they require the use a very small diameter restriction to induce a considerable pressure loss in a compact space, which generates frequent clogging of this restriction, making them unreliable and difficult to implement. Therefore, there is not on the market today no solution that is satisfactory, simple, reliable and easy-to-achieve in a micro-fluidic application.

OBJECT AND SUMMARY OF THE INVENTION

The system for measuring the micro-fluidic flow of a liquid in a micro-fluidic circuit according to the invention is characterized in that that it comprises:
- a reservoir partially filled with this liquid and having a gaseous top,
- means for maintaining the gas pressure in the gaseous top at a predetermined value $P1$,
- means for withdrawing some liquid from the reservoir and for outputting it at a pressure $P2$ inferior to $P1$,
- pressure sensor means including a first input connected to the gaseous top and a second input connected to the liquid output $P2$, the output of the pressure sensor means delivering a signal depending on the difference in pressures ($P1-P2$) representative of the liquid flow at a pressure $P2$ delivered to the micro-fluidic circuit.

Thus, the invention proposes a method for rapidly and precisely measuring a flow of liquid from a reservoir under pressure, by using a single pressure measure at the level of the liquid. This measurement is performed at the output of the reservoir of liquid to be distributed in the micro-fluidic circuit downstream of the reservoir. The pressure of the liquid in the reservoir is controlled by using a pressurized gas preferably, placed over the liquid and forming a gaseous top above this liquid, and pressure loss means such as a pipe preferably in the form of a restriction producing a pressure loss when the liquid flows therein. The flow measure according to the invention is performed by using a means for measuring the difference between the pressure $P1$ of the gas, measured in the reservoir, and the fluid pressure $P2$ measured downstream of the restriction having the hydraulic resistance Rh. The flow D from the restriction meets the law: $D=(P1-P2)/Rh$ (the term "restriction" means according to the invention a pipe or any other means causing a pressure loss during the flow of the liquid through this restriction or more generally, after passage through pressure loss means, both terms being used interchangeably). The difference in pressures (P1-P2) is converted by adapted pressure measuring means into one signal (e.g. electrical) whose amplitude (for example) is proportional to (or depends on) the flow from the restriction.

The hydraulic resistance Rh will preferably be according to the invention higher than $1.2 \times 10$ power 10 $Pa \cdot sL^{-1}$ in order to maintain the flow of micro-fluidic liquid in a reasonable range of pressures. Advantageously, this resistance will be composed of a cylindrical capillary tube whose internal diameter is less than about 300 µm and/or a micro-fluidic channel integrated into a micro-fluidic chip, having preferably a square section and being less than about 300 µm high.

The cavity, containing a pressure-sensitive element (pressure sensor) and preferably the liquid flowing therethrough at a pressure P2, will preferably have a low internal volume, more preferably less than 50 µL, in order to limit the liquid filling and/or transfer times.

In the present description, the expression "pressure measuring means" means a set of one or more "pressure sensors" and their control electronics and/or a computer specially configured to perform the equivalent operations, enabling (according to embodiments the invention) to measure the pressure of the liquid and/or the gas and to output a signal proportional to (P1-P2). These means comprise "pressure sensor means" which are composed of one or more "pressure sensors" designating a mechanical assembly in which the fluid (gas or liquid) flows into a cavity in which a pressure-sensitive element ("pressure sensor") is placed which converts the pressure exerted by the fluid on this element into a usually electric signal.

The pressure sensor means can take different forms: they can be constituted by two pressure sensors, the difference between the measured pressures being calculated for example by using an electronic differentiator circuit or a computer specially configured to calculate the flow of liquid from the restriction, by applying the formula above.

The flow measurement method according to the invention has the advantage to use a single measuring element in contact with the liquid downstream of the restriction, which element can be simple and cheap.

According to a preferred embodiment of the invention, the restriction is not arranged in the liquid pressure sensor but upstream thereof in a portion of circuit of liquid which is not yet micro-fluidic (i.e. which has a pipe diameter higher than about 23 micrometers, diameter commonly used in micro-fluidic applications), which enables to use a larger size (diameter) restriction than when it is part of the micro-fluidic network, preferably higher than 50 µm, more preferably higher than 100 µm), thus limiting the risk of clogging the restriction and therefore the micro-fluidic circuit. The diameter of the capillary tube used very much depends on the range of micro-fluidic liquid flow to be measures, considering that the flow in the capillary varies according to the power 4 of the capillary diameter. A capillary diameter of 23 micrometers corresponds to a water flow measurement scale of about 1 microliter per minute for a capillary length of 135 mm, which corresponds to the most sensitive flow sensors currently available on the market. So, the invention makes it possible to multiply by about three the diameter of the iso-flow resistance, which is a considerable advantage to avoid clogging of the restriction.

For all these reasons, the flow measurement system according to the invention makes it possible to achieve a very good compromise between reliability, speed and accuracy while maintaining a low cost.

The pressure measuring means can be composed, according to a variant of the invention, of a set of two pressure sensors Px each delivering a digital or analog signal Sx representative of the gas pressure or the liquid pressure, the difference in amplitude between the signals being calculated, in a manner known per se, by using a calculator in the case of digital signals or a subtracter circuit in the case of analog signals.

Among the liquid pressure sensors, it will be possible either to use known liquid pressure sensors, or to use the pressure sensor according to the invention (which will be described thereafter). Differentials pressure sensors can also be used for measuring the pressure difference between gas and liquid, either of already known form, or according to a variant of sensor according to the invention.

Thus, according to a preferred embodiment of the system according to the invention, the pressure difference can also be measured by using a differential pressure sensor. This embodiment enables to use only one pressure sensor and to avoid in particular the measurement of the absolute value of the pressure of the liquid and the gas. A sensor can then use that is suitable for measuring a lower pressure range, thus making the measurement of the pressure difference more precise.

According to another embodiment of the invention, the pressure sensor means can also use the same signal as the one used to regulate the gas pressure in the reservoir by using an adjustable pressure regulator.

According to yet another embodiment of the invention, the pressure measurement upstream of the restriction, and therefore the measurement of the liquid flow, can be corrected by the height of liquid in the reservoir, which induces a difference in parasitic hydrostatic pressure which does not come from the pressure loss through the hydraulic resistance Rh. For example, the liquid height can be maintained fixed at a predetermined known value, measured with a sensor or deduced from an initial height of liquid in the reservoir and the cumulated flow from the reservoir.

According to another embodiment of the invention, the flow measurement is used to precisely and quickly control the flow of micro-fluidic liquid, by using an adjustable gas pressure generator and a control system automatically controlling the flow of the liquid to a set value (possibly adjustable) by using for example a PID-type circuit.

In general, the gas constituting the gaseous top above the liquid will usually be compressed air, eventually depleted in oxygen (i.e. having less than 21 volume-% of oxygen) (preferably free of solid and/or liquid impurities by using suitable filters, such as those used to filter the atmosphere of clean rooms). When the liquid is sensitive to oxidation and/or comprises elements likely to be modified by the presence of oxygen (or any oxidizing agent) in contact therewith, it will preferably be used as gas constituting the gaseous top above the liquid (and enabling to push the liquid towards the micro-fluidic circuit) an inert gas selected from nitrogen, argon, rare gases (Kr, Xe, Ne, . . . ) and/or their mixtures.

The invention also relates to a pressure sensor comprising a support (200) provided with a housing in which is arranged a deformable membrane (206) associated with means for measuring f212) the deformation of the membrane, the membrane (206) being able to deform under the action of a fluid under pressure, preferably a liquid, preferably applied to the upper surface (231) of the membrane (206), the means for measuring (212) the deformation of the membrane being electrically connected to electrical contacts (202, 203) enabling to collect an electrical signal depending on the pressure of the fluid, characterized in that the upper surface (231) of the membrane (206) delimits, in the housing of the support (200), the lower face of a cavity (208) also comprising a upper face, cavity into which two separate pipes open, namely respectively the fluid incoming pipe (215) and the fluid outgoing pipe (216) (or vice versa), allowing the fluid to flow in contact with the upper surface (231) of the membrane (206) and in that the sensor comprises a seal (210) arranged laterally around the walls of the housing (200) between the upper surface of the ring (205) holding the membrane (206) and the upper face of the cavity (208).

Preferably, the cavity is substantially free of any dead volume so as to avoid the formation of bubbles in the fluid.

The membrane will preferably be a flexible silicon membrane.

Also, preferably, the means for measuring (212) the deformation of the membrane comprises elements sensitive to the deformation of the membrane such as elements made out of piezo-resistive material.

The means for measuring (212) the deformation of the membrane perform a function of transducers that convert a deformation (extension) of the membrane into a (electrical) signal proportional to (or depending on) the amplitude of this deformation. Thus, these means will preferably include elements sensitive to the deformation of the membrane, such as for example elements made out of a piezo-resistive material, deposited in a thin layer or implanted in the membrane. They can be arranged in a simple pattern or so as to optimize their accuracy, for example as a Wheatstone bridge to improve the sensitivity, or with integration of other elements, for example to compensate for the effect of the temperature on the measurement.

For more details on means using elements sensitive to piezo-resistive materials, one can refer to K. N. BHAT article entitled "Silicon Micromachined Pressure Sensors," Journal of the Indian Institute of Science, vol. 87-1, January-March 2007, journal.library.iisc.ernet.in.

The membrane and the means for measuring the deformation can be covered with an electrically insulating layer to protect them from the electrical conductivity of a liquid in contact therewith, for example water, which could disturb the measurement.

The means for measuring the deformation of the membrane are preferably electrically connected to the outside of the sensor at electrical contacts.

The cavity may have for example a parallelepipedal shape with the two pipes positioned at two opposite upper angles, or a cylindrical shape with both pipes in diametrically opposite positions, or the shape of a channel connecting the two pipes. The absence of a large dead volume (which the skilled person can achieve without difficulty) avoids the formation of bubbles, which can disrupt the pressure measurement if a line of contact of the bubble is in contact with the membrane, in which case the surface tension of the liquid can apply a parasitic force onto the surface of the pressure-sensitive sensor.

On the other hand, it is preferable that no bubble from the sensor is injected into the micro-fluidic circuit, because in many practical cases such a bubble would disrupt flows in the chip and its operation.

Means for measuring the deformation of the membrane can take other adapted shapes such as capacitive means, vibrating means, etc.

Preferably, the volume of the cavity will be less than 50 microliters, preferably less than 10 microliters, and more preferentially less than 5 microliters. In any case, one will make a cavity with as small a volume as possible, but generally higher than 0.1 microliter.

According to a preferred embodiment, especially when the fluid is a liquid, the sensor will preferably be provided with a seal laterally arranged around the walls of the housing between the upper surface of the membrane (or the pressure sensor) and the upper face of the cavity.

Preferably, the sensor comprises a space under the membrane allowing it to move under the action of the pressure of the fluid injected into the sensor.

According to a preferred embodiment, the fluid ingoing and outgoing pipes in the cavity is at an angle between about 10° and 90°, preferably between 20° and 70° and more preferably between 40° and 50°, with the upper surface of the membrane.

According to an embodiment notably of a differential sensor, the support will be traversed by an ingoing pipe for a second fluid a first end of which is close to the lower surface of the membrane. This second fluid may be selected among air at atmospheric pressure (vent function) and/or a liquid or gas including air, preferably at a different pressure, for example higher than the atmospheric pressure.

In general, the space (207) will be provided with an output vent (204). Preferably, the end of the ingoing pipe on the opposite side to the membrane (206) (the second end) will be provided with a fluidic connector (223), in order to bring the second fluid in a tight manner into the pressure sensor, especially when the latter is under pressure, for example a gas.

The invention also relates to a flow measurement assembly which is characterized in that it comprises a reservoir provided with a cap in which a sensor according to the invention is integrated, so as to be secured to the cap, the latter being otherwise traversed by a capillary used as a restriction, which opens into the liquid ingoing pipe, near the sensor cavity. It also concerns a system integrating the flow measurement assembly.

Preferably, the restriction is disposed upstream of the pressure sensor means.

The invention also relates to a system for measuring the flow of a liquid (3) in a micro-fluidic circuit (17), characterized in that it comprises a pressure sensor according to the invention.

In general, the system according to the invention uses the pressure measurement P1 of a gas now under pressure, a liquid flowing in a restriction and exiting from it at a pressure P2 lower than P1 in order to control the flow of this liquid.

More generally, it relates to the use of the gas sensor according to the invention to control the flow of fluid at the inputs and/or outputs of a micro fluidic chip.

BRIEF DESCRIPTION OF THE DRAWINGS

The invention will be better understood with the help of the following exemplary embodiments together with the figures representing:

FIG. 8 is a sectional view of a reservoir system provided with a capillary tube and a flow sensor according to FIG. 7a.

DETAILED DESCRIPTION OF THE EMBODIMENTS

Figure 1:
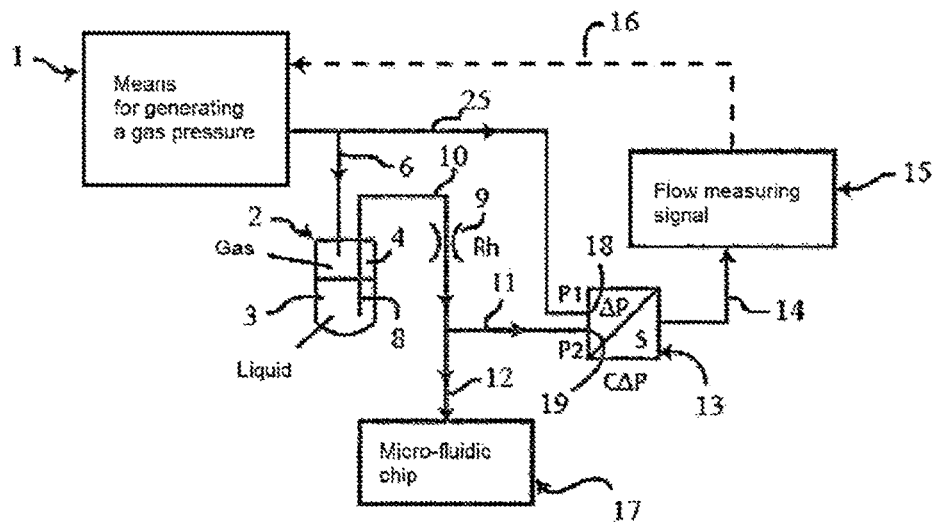
FIG. 1 shows a first schematic representation of the system for measuring the flow of a micro-fluidic liquid according to the invention.

In FIG. 1, means for generating a gas under controlled pressure 1 (compressed air source for example whose pressure is regulated and preferably controllable or bottle of pressurized nitrogen to which is connected a pressure reducing valve/pressure regulator) are connected on the one hand through the pipe 6 to the upper part 4 (or gaseous top) of the reservoir 2, the lower part of which is filled with a liquid 3 (to be circulated in the micro-fluidic chip 17) in contact with the gas in the gaseous top 4 and on the other hand through the pipe 25 to a first input 18 of a differential pressure sensor 13. A pipe 8 is dipped into the liquid 3, leaves the reservoir 2 and is extended by the pipe 10 which comprises a restriction 9 having a hydraulic resistance Rh (in practice, the elements 8, 9 and 10 can be grouped together into a single element, for example a capillary tube dipping in the liquid 3 having a hydraulic resistance Rh, the pressure of the liquid 3 being equal to P2 at the output of the capillary tube), and which is then extended on the one hand by a pipe 11 connected to a second input 19 of the differential pressure sensor 13 and on the other hand by a micro-fluidic pipe 12 the end of which supplies the micro-fluidic circuit (or "chip") 17. The differential pressure sensor 13 (an exemplary embodiment of which will be described below in FIG. 7) generates a signal S on the line 14, the amplitude of which is proportional to the difference in pressures (P1-P2), this signal being converted into a signal of measurement of the flow of the liquid 3 at the output of the restriction 9 in the liquid flow calculation means 15 in the manner explained below (or in a computer specially configured for this purpose). This liquid flow measurement signal 15 can be for example displayed on a digital display (not shown in FIG. 1) and/or used (via the dashed line 16 in FIG. 1) to control/regulate the gas pressure 4 via the means 1. Thus, by measuring the pressure difference between the gas pressure constituting the gaseous top above the liquid 3 in the reservoir (which is thus equal to the pressure of the liquid 3 at the gas/liquid interface in the reservoir 2) and the pressure of the liquid after passing through the restriction 9, one can measure the flow of liquid 3 by simply applying the formula:

Flow of liquid=$(P1-P2)/Rh$, the pressures being expressed in Pascal, the hydraulic resistance in $Pa·s·L^{-1}$ and the flow of liquid in L/s.

The flow of liquid 3 at the input of the micro-fluidic chip 17 can so be simply controlled by varying the pressure P1 of the controlled-pressure gas generator 1 thanks to the pressure reducing valve/pressure regulator at the output of this generator.

The hydraulic resistance will preferably be higher than $1.2 \times 10$ power 10 $Pa·s·L^{-1}$. According to a preferential embodiment, the hydraulic resistance Rh will be constituted by a cylindrical capillary tube the inner diameter of which is preferably less than 300 μm and/or by a micro-fluidic channel integrated in a chip having a square section and being less than 300 μm high.

The means for measuring the liquid pressure will comprise preferably a small volume of internal liquid, preferably less than 50 μL in order to limit liquid filling and transfer times.

Figure 2:
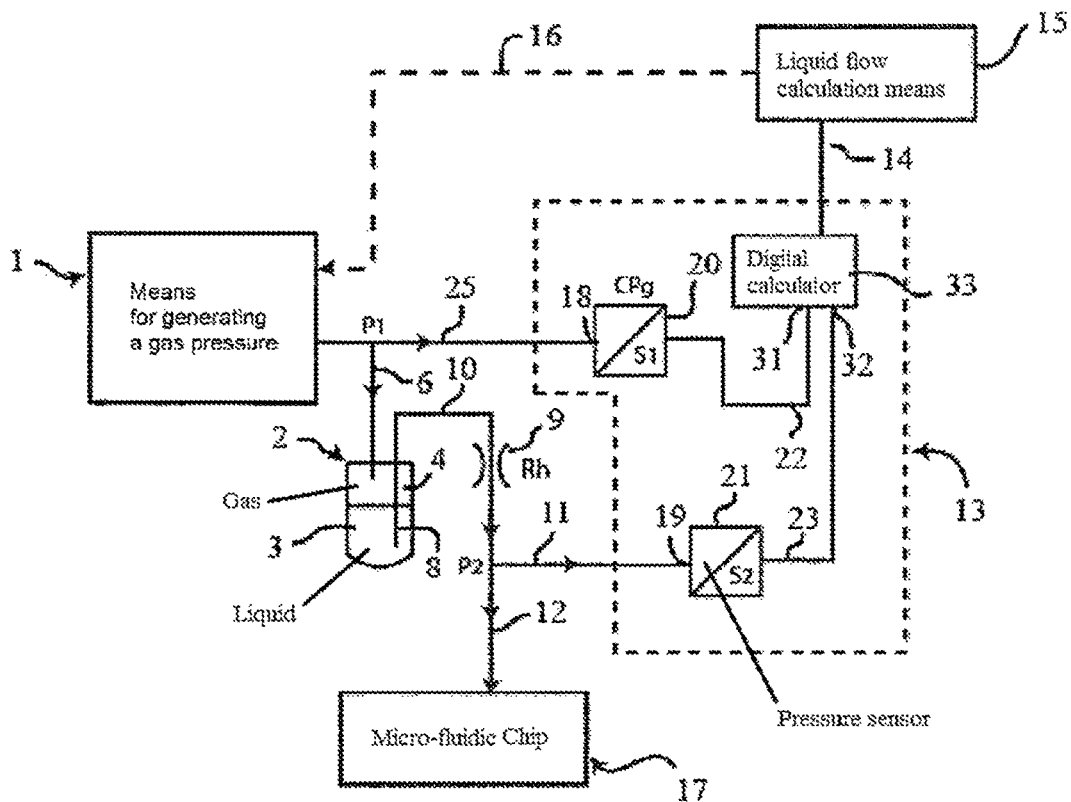
FIG. 2 shows a second schematic representation of the system for measuring the flow of a micro-fluidic liquid according to the invention.

FIG. 2 is a variant of the system shown schematically in FIG. 1. In this figure as well as in all other figures, the same elements have the same references and fulfill the same functions. In this FIG. 2 the differential pressure sensor 13 consists of 2 pressure sensors 20 and 21, the difference in respectively measured pressure values is calculated for example with the help of a differentiating electronic circuit or a specially configured digital calculator 33.

Any type of pressure sensor well known to a person skilled in the art, which can measure the pressure of a fluid (gas or liquid) can be used to measure the amplitude of the pressure P1 or P2, since it delivers a signal S, preferably electrical, whose value depends on (for example proportional to) the amplitude of the measured pressure. Thus, the sensor 20 receives the gas 4 directly at its input 18 and delivers an analog (or digital) signal Si on the line 22 at a first input 31 of a differentiating circuit 33 (or respectively a calculator specially configured to perform the subtraction operation) whose output is connected to the input of the flow calculation means 15 (with or without a digital display) via the line 14. The second input 32 of the circuit 33 receives the signal S2 delivered on the line 23.

Figure 3:
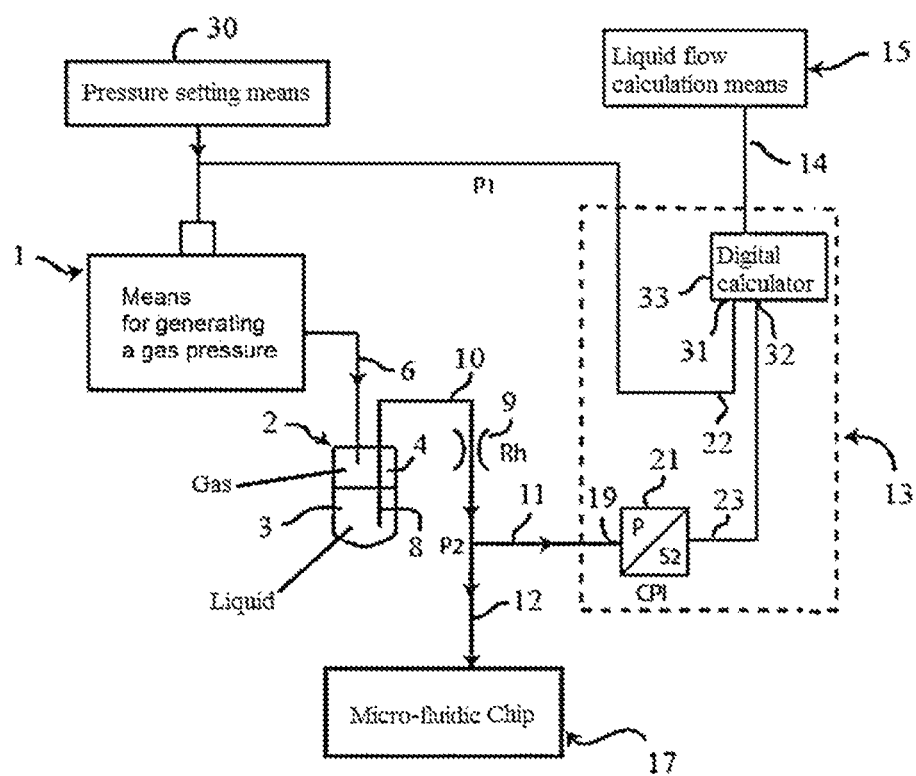
FIG. 3 shows a third schematic representation of the system for measuring the flow of a micro-fluidic liquid according to the invention.

FIG. 3 is another embodiment of the system in FIG. 2, in which pressure setting means 30 are provided which generate a pressure setting signal to the means 1 in order to generate a gas under pressure (here these means generate a variable and controlled pressure according to of the setting point), this pressure setting signal enabling on the one hand to regulate the pressure of the gas to the desired value P1 and on the other hand via line 22 to provide the input 31 of the circuit or computer 33 with a signal whose amplitude (for example) is that of the pressure P1 of the gas. Others elements of the system in FIG. 2 remain unchanged in this FIG. 3.

Figure 4:
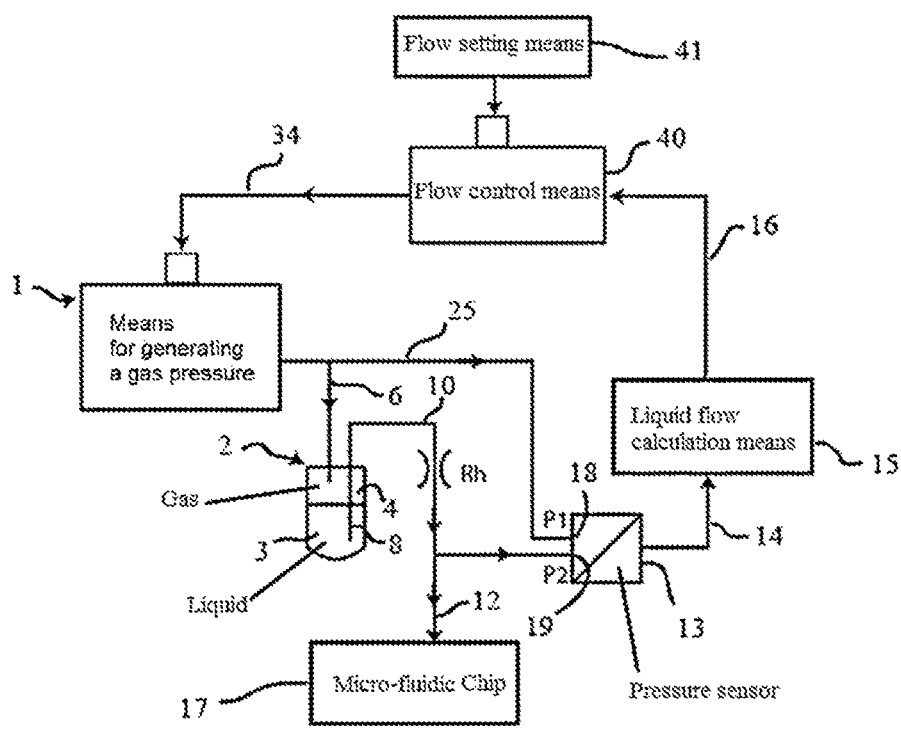
FIG. 4 shows a schematic representation of a system for controlling the flow of a micro-fluidic liquid according to the invention.

FIG. 4 is a variant of FIG. 1 in which flow control means 40 are interposed between the means 15 and the means 1, these control means receiving through the line 16 the measuring signal for the liquid flow and adjusting the amplitude or the value thereof according to the flow setting means 41, and delivering through the line 34 a pressure setting signal to the means 1 (this pressure setting signal having an amplitude or value calculated with the help of the above-mentioned formula of the flow according to the pressures).

According to an embodiment, the flow measurement can be corrected with the height of liquid in the reservoir, which induces a parasitic hydrostatic pressure difference not originating from the pressure loss across the hydraulic resistance Rh. The height of liquid may be for example maintained fixed and known a priori, measured with a sensor or deduced from an initial height and the cumulative flow from the reservoir.

Advantageously, this flow measurement method can be used to accurately and quickly control a micro-fluidic liquid flow with the help of an adjustable pressure gas generator and a control system 40 automatically controlling the flow according to a setting point (for example PID).

Figure 5:
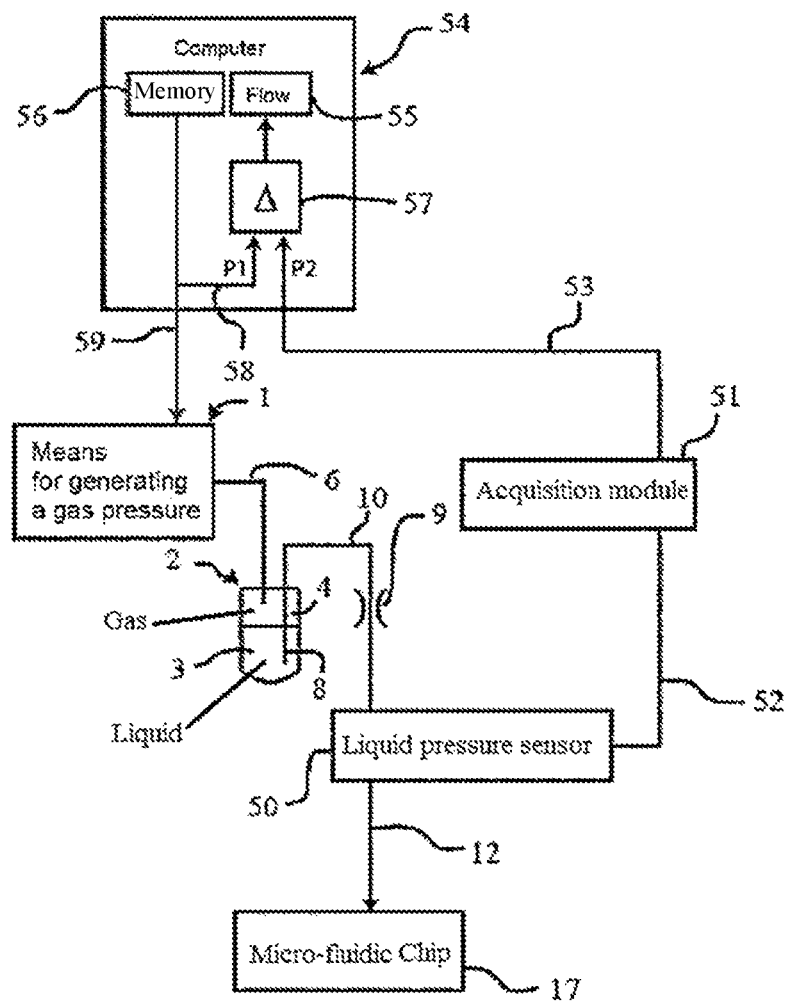
FIG. 5 shows a schematic example of measurement of the flow of a micro fluidic liquid according to the invention.

FIG. 5 shows a first practical exemplary embodiment of the system according to the invention, in which the means 1 are a pressure controller sold under the commercial name ELVEFLOW OBI (ELVEFLOW is a registered trade mark of the company ELVESYS) operating in a range of (relative) pressures from 0 to 2 bar (0 to 2×10 power 5 Pascal) which controls the pressure of gas from a gas source (no shown in the figure) to the desired value. The pressure restriction means 8, 9, 10 are composed of a capillary tube made out of thermoplastic material, for example of polyetheretherketone (or PEEK) type, having an internal diameter equal to 150 micrometer and a length of 0.135 m, which tube is immersed at a first end in the liquid 3 and feeding at its other end a liquid pressure sensor 50 of "through" type as described hereinafter in FIG. 7, delivering at its output on the pipe 12 a liquid 3 at a flow that can vary between 0 and 1.15 mL/min. This sensor 50 also delivers an analog electrical signal proportional to the pressure P2, via the line 52 to the acquisition module 51 of the trade name "Elveflow Sensor-Reader" which converts the analog signal into a digital signal representing the value of the pressure P2 and sends this information via the line 53 to the computer 54 specially configured to perform the operations that will be described below. The computer 54 also receives, via the line 58, a piece of information in digital form representing the value of the pressure P1 imposed to the gaseous top 4 via the mean 1 and the line 59 which transmits the setting point of the pressure. P1 to the means 1. The computer performs the subtraction operation for the pressures P1 and P2 then the associated calculation operation for the flow (as explained above) and the possible addition operation of multiplying coefficients in order to obtain (and to display if necessary) the flow of liquid 3 (which will be injected into the micro-fluidic circuit 17) with the help of the means 55. In this specific example, the pressure setting point for the means 1 is entered into the memory 56 in the computer 54, for example with the help of the alphanumeric keyboard connected to the computer 54.

Figure 6:
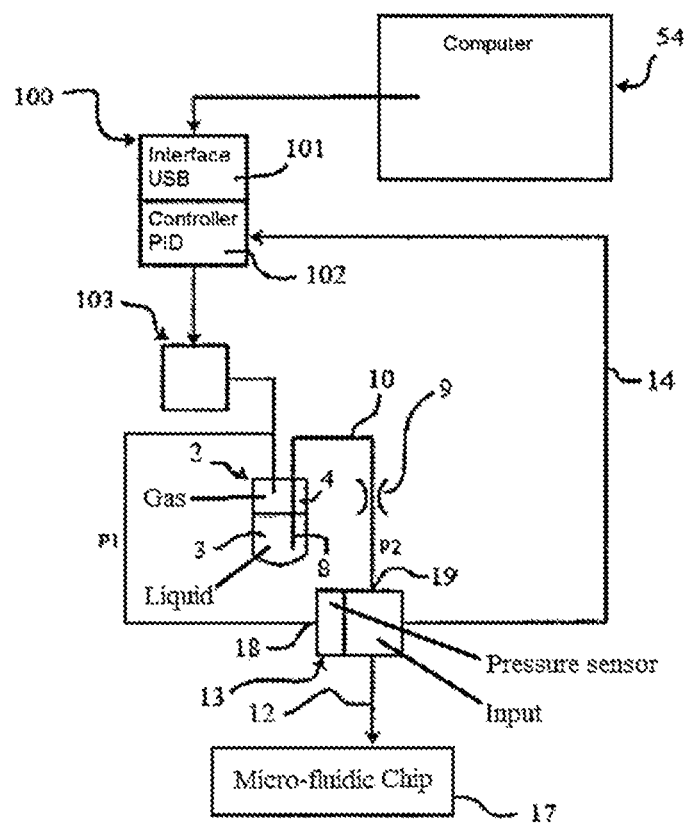
FIG. 6 shows an example of control of the flow of a micro-fluidic liquid according to the invention.

FIG. 6 is an exemplary embodiment of the invention making it possible to rapidly control the flow of the liquid 3 in the micro-fluidic circuit 17. As in FIG. 5, the same PEEK capillary tube having an internal diameter of 150 microns and a length of 0.135 m is used to create a restriction of hydraulic resistance Rh. The differential pressure sensor 13 as described hereinafter in FIG. 7b is used here, with the gas and liquid inputs, respectively 18 and 19, the liquid 3 passing in contact with the membrane of the piezo-resistive sensor and coming out through the pipe 12 towards the micro-fluidic circuit. The gas is in contact with the membrane on the side opposite to the liquid and thus maintains a pressure thereon opposite to the pressure exerted by the liquid on the other side thereof. This results at the electrodes of the sensor 13 an electric signal sent via the line 14 to the input of a PID controller 102 which sends a pressure setting signal to the pressure controller 1 in order to regulate the pressure P1 of the gas 4. The PID controller 102 is a part of the electronic control means 100, which on the whole make it possible to ensure the pressure control for the gas with the help of the signal from the sensor 13 and a flow setting point generated by the computer 54 specially configured for this task, which flow setting point being transmitted to the PID controller 102 via a USB type interface 101. With such a configuration, it has been found that it is possible to obtain a set-up time for a controlled flow in less than 100 ms.

Figure 7A:
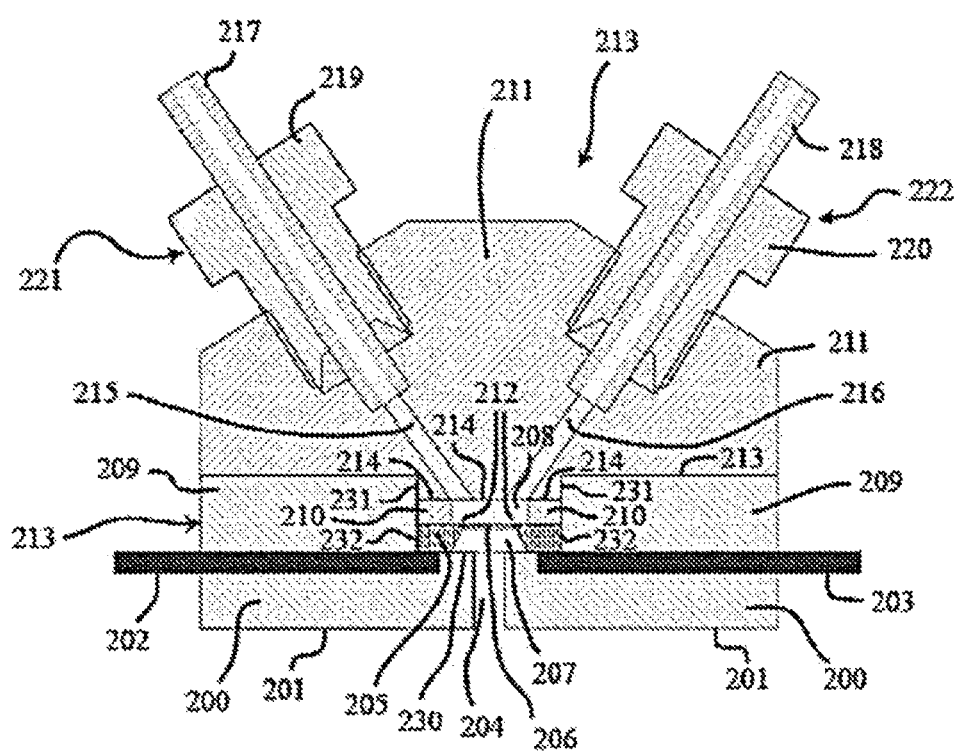
FIGS. 7a and 7b respectively show a sectional view of a flow sensor and a differential flow sensor according to the invention.
Figure 7B:
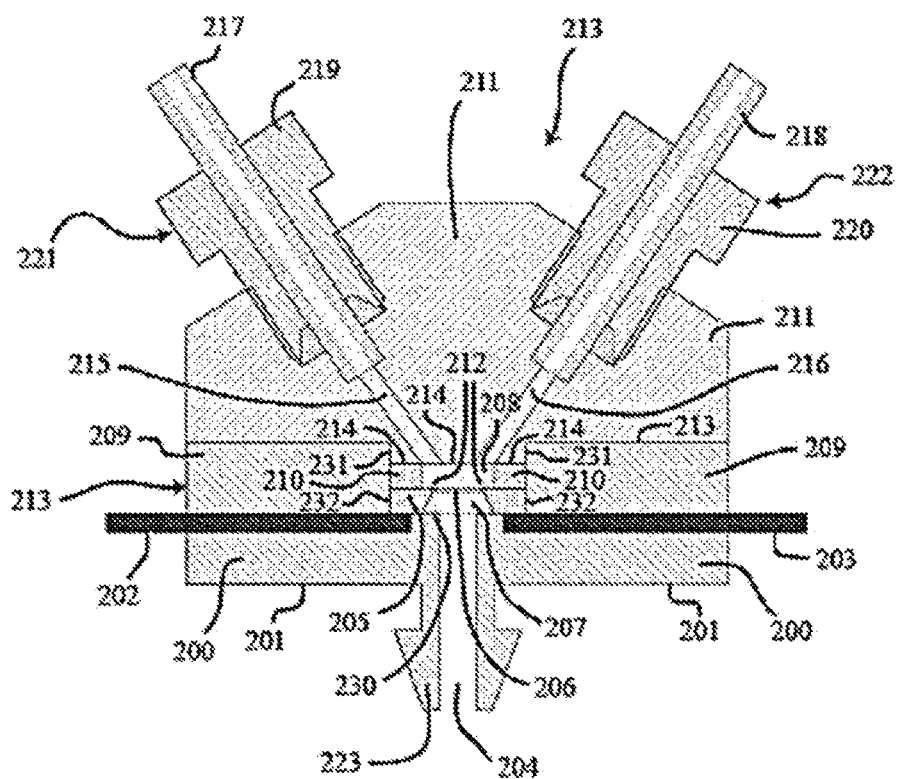

FIG. 7a is a sectional view of the pressure sensor according to the invention. The sensor 213 comprises a lower portion 200 and an upper portion 211. The lower portion 200 comprises a lower face 201 and an upper face 230. A space 207 is delimited by the upper face 230 and the lower face of the membrane 206 of low thickness of a piezo-resistive sensor and laterally by a ring 205, thicker than the membrane, extending the membrane 206 and secured thereto so as to support it. The membrane 206, deformable under the action of a fluid under pressure, is a flexible membrane in silicon supported by a thicker ring 205, the assembly integrating the means for measuring the deformation of the membrane 212, which comprise elements sensitive to the deformation of the membrane such as elements, made out of piezo-resistant material. The lower part of this ring 205 is supported on the one hand by the upper surface 230 of the lower part 200, so as to laterally delimit the space 207, and on the other hand by the ends of electrodes 202, 203 embedded in the upper surface 230 (or simply put thereon). Between the electrodes 202 and 203 and the ring 205, an electrical conductive element can be arranged such as a seal or a conductive adhesive (which is not shown in the figure) for the electrical connection of the sensitive elements. Above this surface 230 is disposed a support 209 (which may be integral with the lower part 200) comprising a through opening on the side wall 231 which is supported by the side face 232 of the ring 205. The upper face of the membrane 206 is extended on the upper part of the ring 205 forming a single flat surface up to the side wall 231 (In practice, the elements 205 and 206 are made in the same block of silicon by etching, as described the above-mentioned N. K. BATH document, on page 121.) which is supported by a square-ring-shape seal 210 delimiting a cavity 208 substantially above the membrane 206 and opening thereon. The space 207 provides the membrane 206 with the necessary clearance when this membrane is hollowed under the action of the force exerted by the liquid at the pressure P2 on the membrane 206. It should be noted that the space 207 which is provided with an output vent 204 for the air trapped in this space remains in fluid communication with the external environment in order to maintain a pressure always equal to the atmospheric pressure, regardless of the pressure exerted by the membrane. This vent can also be connected (via a pipe not shown in the figure for example) to a source of gas (air, inert gas, etc.) having a pressure equal to or different from the atmospheric pressure. When the gas is at atmospheric pressure, the sensor makes it possible to measure the relative pressure of the liquid (and not its absolute pressure). When the pressure of this gas is different from the atmospheric pressure, the sensor makes it possible to measure a pressure difference between the liquid and the gas.

The sensor 213 has an upper part 211 (conduct support) whose lower face comprises a projecting part 214 which is housed at the top of the opening delimited by the side wall 231 by laterally pressing the seal 210 and by closing the cavity 208 in a sealing manner against fluids (particularly liquids).

Two pipes, 215 and 216 respectively, opens into this cavity 208 at its upper part and extends approximately 45° from each other to the outside of the upper part 211 via the micro-fluidic connectors 10/32 UNF and their respective ferrules 221 and 222 and micro-fluidic capillary tubes 217 and 218 which pass respectively through the bodies 219 and 220 of the connectors which are screwed for example in the conduct support 211 in order to ensure fluid sealing. In use, the liquid under pressure P2 is injected through the pipe 215 and fills the cavity 208 and then exits via the pipe 216 (or vice versa) in the direction of the micro-fluidic circuit 17 and exerts on the upper face of the membrane 208 a thrust (downwards in the figure) proportional to the pressure P2. In this way, and thanks to the membrane 206, an electrical signal is thus picked up at the electrodes 202, 203 whose amplitude proportional to the pressure P2 of the liquid (of course, any fluid can be used instead of a liquid). For more details on this type of membrane, one can refer for example to the above-mentioned K. N. BATH article.

FIG. 7b is a sectional view of the differential pressure sensor according to the invention, similar to that one described in FIG. 7a but whose opening 204 is provided in its lower part with a fluid connector 223 for receiving a second fluid, preferably a gas, preferably under pressure, in the space 207. The sensor 213 comprises a lower portion 200 and an upper portion 211.

The lower part 200 comprises a lower face 201 pierced substantially at its center with a conduct 204 for a fluid (preferably a gas, such as the gas 4) which opens into a cavity 207 delimited in its upper part by the lower face of the membrane 206 and laterally held by a ring 205 extending the membrane 206 and secured thereto. The lower part of the ring 205 rests against the upper face 230 of the lower part 200 so as to create the cavity 207 and surround the upper end of the conduct 204, as well as on the ends of electrodes 202, 203 fitted in this upper face 230 (or simply placed thereon). Above this surface 230 is disposed a support 209 (which can be integral with the lower part 200) comprising a through opening against the side wall 231 of which rests the side face 232 of the ring 205. The upper face of the membrane 206 extends onto the upper part of the ring 205 forming a single plane surface up to the side wall 231, against which rests a ring-shaped seal 210 defining a cavity 208 substantially above the membrane 206 and opening therein. The sensor 213 comprises an upper part 211 (conduct support) whose lower face comprises a projecting part 214 which is housed at the top of the through opening delimited by the side wall 231 laterally bearing on the seal 210 and closing the cavity 208 in a sealing manner against fluids (in particular liquids). Two pipes, 215 and 216 respectively, open into this cavity 208 at its upper part and extend approximately 45° from each other to the outside of the upper part 211 via the micro-fluidic connectors 221 and 222 and the micro-fluidic capillary tubes 217 and 218 which pass respectively through the "caps" 219 and 220 which are screwed by example in the conduct support 211 in order to ensure fluid sealing. In use, the gas under pressure P1 is injected in a sealing manner into the conduct 204 and exerts a thrust onto the lower face of the membrane 206 and the liquid under pressure P2 is injected through the pipe 215 and fills the cavity 208, then exits via the pipe 216 (or vice versa) towards the micro-fluidic circuit 17 and, in equilibrium, exerts onto the upper face of the membrane 208 a thrust of opposite direction proportional to the pressure P2. Thus, thanks to the means for measuring the deformation of the membrane 212, which comprise sensitive piezo-resistive elements, an electrical signal is picked up at the electrodes 202, 203, whose amplitude is proportional to (or depends on) the difference in fluid pressure P1–P2.

Figure 8:
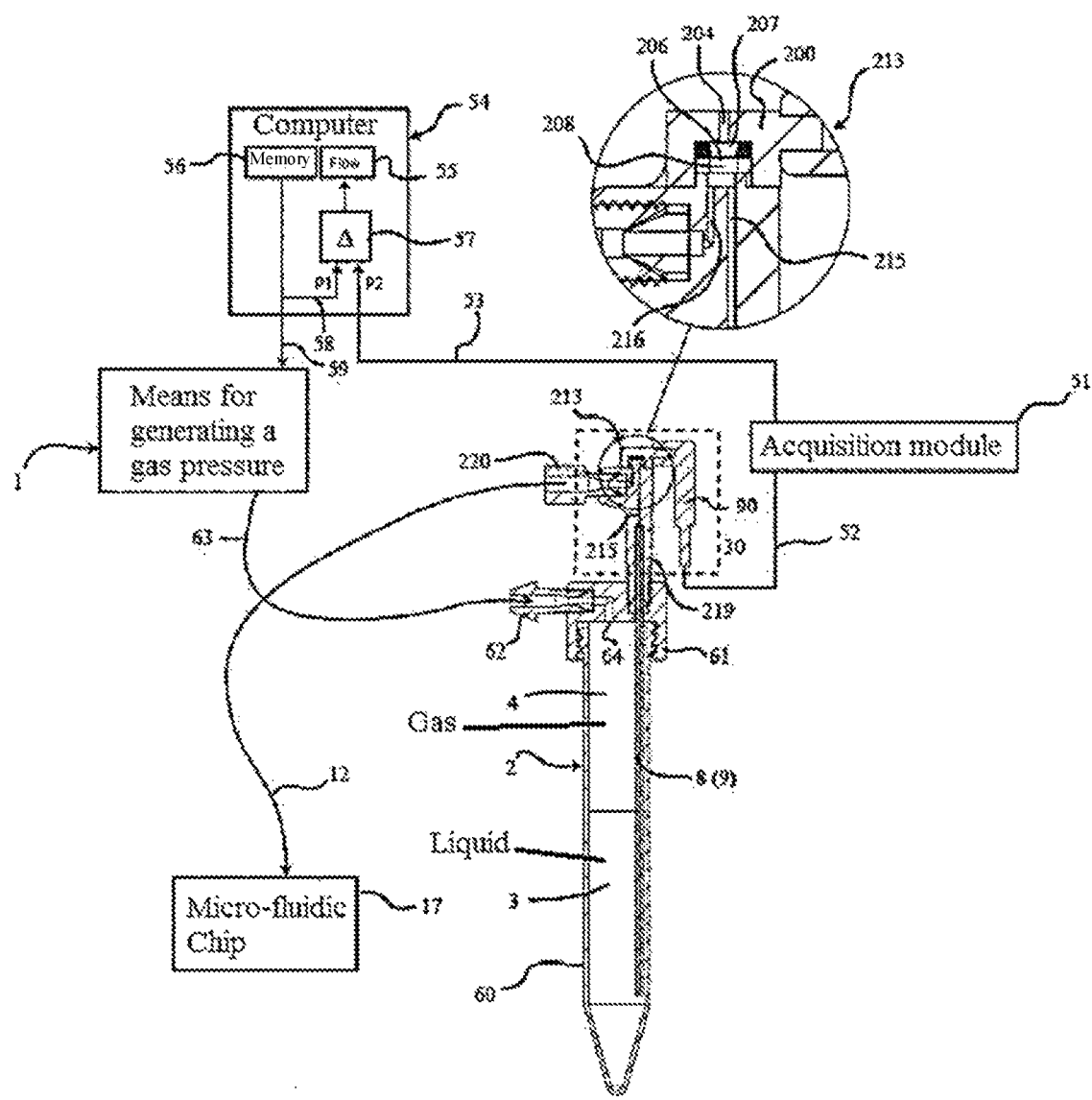

FIG. 8 depicts an exemplary embodiment of the invention such as shown in FIG. 5 with integration of a fluid flow sensor and a fluid (liquid) reservoir. The reservoir 2 consists of a body 60, having here a cylindrical shape, closed at its lower part and covered at its upper end by a cap 61 which hermetically close it and to which is laterally connected a fluid connector 62 which is connected at a first end to a fluidic (and preferably not micro-fluidic) pipe 63 itself connected to the gas pressure controller 1 (of Elveflow OB1 type operating in the range of relative pressure $0-2\times10$ power 5 Pascal), and at a second end by the pipe 64 at the upper part of the reservoir 2 corresponding to the gaseous top 4 when this reservoir is partially filled with the liquid 3 in its lower part. In this example, the resistance Rh 8 takes the form of a capillary tube made out of a material such as polyetheretherketone or PEEK, of 150 µm internal diameter, preferably disposed substantially parallel to the wall of the body 60 so as to plunge into the liquid 3 and make it go up in the capillary tube 8 under the effect of the pressure exerted in operation onto the surface of the liquid 3 by the gas 4 under pressure. This gas should preferably be a "clean" gas such as used in clean rooms (free of particulates and/or chemical and/or physical impurities) in order to prevent the liquid 3 for the micro-fluidic circuit 17 from being contaminated. This gas will preferably be compressed air but can also be an inert gas as described above when it is desired to avoid a possible interaction between the oxygen in the air and the liquid 3, preferably nitrogen and/or argon in bottles of appropriate quality but also air depleted in oxygen (less than 1% to 10% in volume of oxygen), possibly supplied by a membrane-type on-site generator or by adsorption. If necessary, this gas can also be free of all its mineral and/or organic impurities with the help of suitable filters (used for example to filter the atmosphere of clean rooms). The capillary tube 8 also sealingly extends through the cap 61 of the reservoir 2 and enters via the fluid connector 219 the liquid input circuit of the sensor 213, i.e. the pipe 215 extending the capillary 8 and then the pressure measurement cavity of the liquid 208, then the output pipe 216 towards the capillary output connector 220 into which the pipe 12 for supplying the micro-fluidic circuit 17 is connected. The lower part 200 of the sensor 213 (here in the upper position) electrically connects the electrodes 202, 203 of the sensor via the electrical connector 90 and the line 52 to the data acquisition module having the commercial denomination Elveflow SensorReader 51, itself electrically connected via the line 53 to the computer 54 (refer to FIG. 5 for the processing of data by the specially configured computer 54). The integration of the silicon pressure sensor element, which contains a membrane, deforming in response to the liquid pressure, coupled to a piezo-resistive gauge for converting this deformation into an electrical signal, is here optimized to limit the volume of the measuring cavity 208 to a few microliters. The fluid (liquid 3) path in the sensor according to the invention is configured so that there is no dead volume at the sensor (the liquid input and the liquid output of the measuring chamber are made by means of different pipes) so as to avoid the formation of bubbles.

The computer 54 is specially configured to calculate the liquid flow 3: for this purpose, the computer calculates the pressure difference between the applied gas pressure P1 in the reservoir with the help of an Elveflow OB1 type pressure controller and the pressure sensor, integrated in the cap of the reservoir, which measures the pressure of the liquid at the output of the reservoir 2 and then deduces the flow of liquid in the circuit using the equation $D=(P1-P2)/Rh$ as previously described.

An exemplary use of the invention as described in this FIG. 8 consist of dripping a cell culture medium into a micro-fluidic chamber (17), in which living cells (mammalian cells, yeast or other cells) are cultured, to precisely control the renewal rate for nutrients provided by the liquid 3 into the chamber 17 on the one hand and the mechanical shear on the cells produced by the dripping rate, which can be deleterious to cells, on the other hand.

Another application of this embodiment is the dripping operation for one or more reagents into a continuous flow chemical reactor made in a micro-fluidic chip. In this case, the flows need to be precisely controlled in order to respect the stoichiometry of the reaction.

In a third application, the flow measurement can be a means of controlling that the conducts of a micro-fluidic chip do not become clogged during their use. Indeed, when a micro-fluidic pipe becomes clogged while constant pressures are applied to the liquids entering these pipes, the flow drops, which can be detected simply and at a low cost.

In a last application, the flow control is used to produce drops at a high rate (of the order of 1000 samples per second) with the help of a micro-fluidic chip and by using a mixture of several reagents as a liquid for forming the drop. This type of drop generator is useful for automatically performing multi-dimensional reaction phase diagrams, which requires testing a very large number of reagent concentration combinations. This may be useful for example in crystallography to test the crystallization conditions of a protein by independently varying pH, protein concentration and ionic strength, or in organic chemistry to know the concentrations of two reagents and a catalyst that are optimal for the best performance, etc.

To evaluate the accuracy of the flow measurement in the exemplary embodiment of the invention shown in FIG. 8, we have compared the pressure difference P1–P2 measured by the device in FIG. 8 with an independent flow measurement obtained by measuring the mass of liquid dripped over a period of time. This method enables also to precisely calculate the value of the resistance Rh which enables to calculate the flow D from the pressure difference P1–P2. In this experiment shown in FIG. 9, a fixed pressure P1 is imposed by a gas pressure controller 1 (of the type Elveflow OB1 operating in the relative pressure range 0-2 bar) laterally connected to a reservoir 2 of 50 ml via a pipe 63 connected to a cap 61 which hermetically covers the reservoir as shown in FIG. 8. This reservoir contains filtered water on which the pressure generated by the gas pressure controller 1 is applied. In this example, the capillary tube 8, here in Polyetheretherketone or PEEK, has an inside diameter of 0.135 m long, is placed so that one of its ends is immersed in the liquid 3 the pressure P1 is applied on and the other end is at the pressure P2 measured by the pressure sensor 50 and opens via a capillary tube 12 into an output reservoir for accumulating the dripped liquid.

Figure 9:
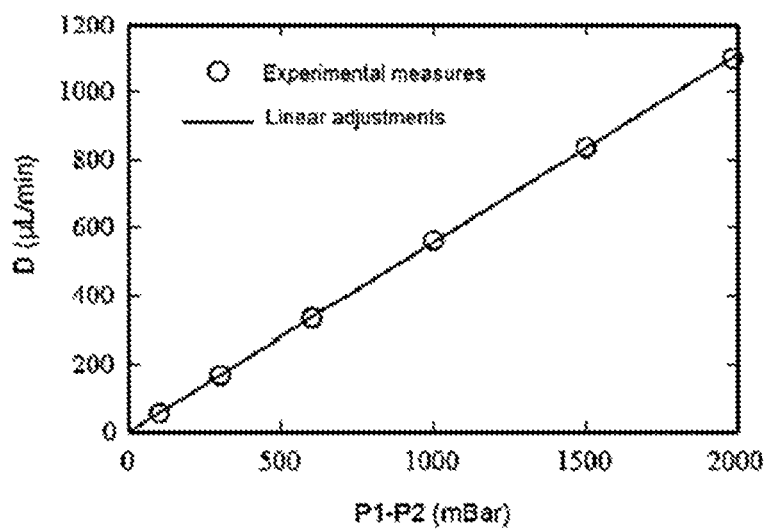
FIG. 9 shows a curve representing the flow measured as a function of the pressure difference P1-P2.

To obtain FIG. 9, a constant pressure P1 is applied by the gas pressure controller 1 for a time t varying from 360 s for the largest flows to 1500 s for the smallest flows (The measuring time being adjusted in order to obtain a better precision). During this time t, the pressure difference P1–P2, which is constant, is measured while the output reservoir gradually fills (P1 here is the signal used to control the pressure controller 1 and P2 is the signal from the sensor 213). Once the time has elapsed, the reservoirs are weighed on a precision balance, first filled with the liquid that has been brought by the pressure during the experiment and then emptied and dried in order to precisely know the weight of the tube. The difference between these two measurements gives very precisely the mass m of liquid dripped during the time t, from which one deduces the dripped flow D with the formula D=m/(rho·t) or rho is the density of the liquid (for the water used in this experiment rho=1000). FIG. 9 shows that P1–P2 is proportional to the flow measured by the mass. A linear regression on experimental data presented in FIG. 9 makes it possible to precisely calculate the resistance Rh of the capillary 8 (Rh=1.076×1013 Pa·s·m−3+/−0.3% s.e.m.). By using this value of Rh, the device presented in this example enables, in the configuration shown in FIG. 8, to control a flow D in the micro-fluidic chip 17 with an accuracy of 0.75% of the full scale.

The invention claimed is:

1. A system to measure a flow of a liquid in a micro-fluidic circuit, comprising:
a reservoir partially filled with the liquid and having a gaseous top;
a pressure regulator configured to maintain a gas pressure in the gaseous top at a predetermined but adjustable value P1;
a pipe comprising a restriction to withdraw the liquid from the reservoir and to output the liquid at a pressure P2 less than P1;
a pressure sensor comprising a first inlet connected to the gaseous top and a second inlet connected to the pipe outputting the liquid at the pressure P2, with the restriction in the pipe being arranged upstream of the pressure sensor, the pressure sensor outputs a signal based on a difference in pressures (P1-P2) which is a representative measure of the liquid flow at a pressure P2 delivered to the micro-fluidic circuit, the signal being transmitted to the pressure regulator to control the flow of the liquid;
wherein the pressure regulator controls the flow of the liquid by varying the pressure P1.

2. The system according to claim 1, wherein a hydraulic resistance of the restriction is greater than or equal to $1.2 \times 10$ power 10 Pa·s·L$^{-1}$.

3. The system according to claim 1, wherein the restriction is formed by a capillary tube having a diameter less than 300 micrometers.

4. The system according to claim 1, wherein the measurement is used to control the flow of the liquid flowing through and out of the restriction at the pressure P2 less than the gas pressure P1.

5. The system according to claim 1, wherein the pressure sensor comprises a support comprising a housing in which are disposed a deformable membrane associated with a deformation sensor configured to measure a deformation of the deformable membrane, the deformable membrane being configured to deform under an action of a fluid under pressure, the deformation sensor being electrically connected to electrical contacts for picking up an electric signal based on a fluid pressure; wherein an upper surface of the deformable membrane delimits a lower face of a cavity in the housing of the support, the cavity also comprising an upper face; further comprising a fluid incoming pipe and a fluid outgoing pipe connected to the cavity to allow the fluid to flow in contact with the upper surface of the deformable membrane; and wherein the pressure sensor comprises a seal arranged laterally around walls of the housing between an upper surface of a ring holding the deformable membrane and the upper face of the cavity.

6. The system according to claim 5, wherein the deformable membrane is a flexible silicon membrane.

7. The system according to claim 5, wherein the deformable membrane is configured to deform under an action of a liquid applied onto the upper surface of the deformable membrane.

8. The system according to claim 5, wherein the deformation sensor comprises elements sensitive to the deformation of the deformable membrane, the elements of the deformation sensor being made of a piezo-resistive material.

9. The system according to claim 5, wherein a space under the deformable membrane allows the deformable membrane to move under the action of the fluid under the pressure injected into the deformation sensor.

10. The system according to claim 9, further comprising an output vent in the space under the deformable membrane.

11. The system according to claim 5, wherein the fluid incoming pipe and the fluid outgoing pipe form with the upper surface of the deformable membrane an angle between 10° and 90°.

12. The system according to claim 11, wherein angle is between 20° and 70°.

13. The system according to claim 5, wherein a volume of the cavity is less than 50 microliters.

14. The system according to claim 13, wherein the volume of the cavity is less than 10 microliters.

15. The system according to claim 5, wherein the support is traversed by a second incoming pipe for a second fluid, a first end of the second incoming pipe being close to a lower surface of the deformable membrane.

16. The system according to claim 15, wherein a second end of the second incoming pipe, located on an opposite side of the deformable membrane, is provided with a fluid connector configured to supply a gas under pressure.

17. The system according to claim 5, wherein the pressure sensor is part of a flow measuring assembly composed of the reservoir provided with a cap, the pressure sensor being integrated with the cap, the cap being traversed by a capillary tube, used as a restriction, which opens into the fluid incoming pipe close to the cavity.

* * * * *